US006575288B2

(12) United States Patent
Bartels et al.

(10) Patent No.: US 6,575,288 B2
(45) Date of Patent: Jun. 10, 2003

(54) SORTING DEVICE FOR LAMINAE

(75) Inventors: Hugo Bartels, Rietberg (DE); M. Ali Mansuroglu, Wadersloh (DE); Wolfgang Melies, Rietberg (DE); Thomas Lücking, Buren-Steinhausen (DE); Heribert Tölle, Paderborn (DE)

(73) Assignee: Robert Burkle GmbH, Freudenstadt (DE)

(*) Notice: Subject to any disclaimer, the term of this patent is extended or adjusted under 35 U.S.C. 154(b) by 27 days.

(21) Appl. No.: 09/877,924

(22) Filed: Jun. 8, 2001

(65) Prior Publication Data

US 2002/0027058 A1 Mar. 7, 2002

(30) Foreign Application Priority Data

Jun. 10, 2000 (DE) ........................................ 100 28 918

(51) Int. Cl.[7] ................................................ B65G 47/26
(52) U.S. Cl. ........................................ 198/438; 198/436
(58) Field of Search ................................ 198/436, 438, 198/493, 428, 429, 451

(56) References Cited

U.S. PATENT DOCUMENTS 2,497,874 A * 2/1950 Evans et al. ............ 198/436 X
2,991,893 A * 7/1961 Kirsch et al. ........... 198/438 X
4,457,420 A * 7/1984 Ducloux ................. 198/438 X
5,135,101 A * 8/1992 Dudley ........................ 198/438
5,909,796 A * 6/1999 Soldavini ................ 198/436 X

FOREIGN PATENT DOCUMENTS

| | | | | |
|---|---|---|---|---|
| DE | 687587 | * 2/1940 | ................. 198/438 |
| DE | 3835438 A1 | 4/1990 | |
| DE | 19833289 A1 | 1/1999 | |
| IT | 677426 | * 12/1964 | ................. 198/436 |

* cited by examiner

*Primary Examiner*—James R. Bidwell
(74) *Attorney, Agent, or Firm*—Volpe and Koenig, P.C.

(57) ABSTRACT

A sorting device for laminae, especially for inlaid floor laminae of wood, is proposed which has a delivery point in a horizontally extending transport track and a delivery track proceeding from the delivery point. The laminae to be sorted out are lifted up from the transport track and transferred to the delivery track arranged above the transport track by a controllable deflection apparatus which transmits an upwardly directed impulse to the laminae to be sorted out. To support a defined transfer of the sorted laminae to the delivery track, a guide element arranged above the delivery point can be present which is preferably constructed as a suction band conveyor with acceleration effect for the laminae.

11 Claims, 5 Drawing Sheets

SORTING DEVICE FOR LAMINAE

BACKGROUND

The invention concerns a sorting device for laminae, especially for inlaid floor laminae of wood with a basically horizontally extending transport track for the laminae, with at least one delivery point for discharge of the laminae to be sorted out of the transport track, and with a delivery track proceeding out of the delivery point, whereby the delivery point is provided with a deflection apparatus for diverting the laminae to be sorted out to the delivery track.

Such sorting devices are in particular used in the manufacture of surface layer laminae for wood inlaid floors. Since wood is a natural product, the freshly manufactured laminae as a rule manifest different surface structures. As surface layer lamina for qualitatively high grade inlaid floors, however, only laminae with uniform graining, and especially without irregularities caused by branch attachment points, may be used. There are, however, various gradings according to quality standards.

The sorting of inlaid floor laminae according to quality grades usually still takes place by hand. Nevertheless, automatically operating sorting facilities with devices of the type mentioned above are being used in recent times to attain a higher through-put in sorting. The laminae to be sorted are separated on a transport track from a supply magazine, on which they are transported basically standing horizontally on their on one of their narrow sides. A camera is installed on this transport track through which the quality of the inlaid floor laminae scanned by the camera is recognized. A central control unit of the facility allocates the quality recognized to a certain delivery point within the transport track and actuates a deflection apparatus installed there at the point in time at which the appropriate lamina passes the delivery point. The lamina is then pushed laterally by the deflection apparatus out of the transport track and falls on a delivery track running crosswise in relation to the transport track, which guides it to a collection point at which laminae of homogenous quality are collected.

A through-put of about 150 inlaid floor laminae per minute can be attained with a sorting facility of the type just described. The rate of processing is nevertheless restricted by the fact that railing-like guide elements are necessary in order to protect the laminae transported in a standing position from falling over, and that interruptions of these guide elements must be correspondingly provided, as well as afterward catching devices for laminae which have not been discharged. The railing-like guide elements in addition exert a braking action on the laminae due to the effect of friction, in contrast to which the friction between the laminae and the transport track constructed as a conveyor band is relatively small, as the laminae are only standing on one of their narrow sides on the conveyor band.

With this state of the art, standing transport of the laminae on the transport track is deliberately preferred to transportation lying down, as such a transport indeed makes the railing-like guide elements just mentioned superfluous, but nonetheless brings considerable speed-limiting problems at the delivery point along with it, as pushing the laminae off laterally is associated with disadvantageous delays due to the high friction between the laminae and the conveyor band: With a conveying speed of 1 m/sec., a gap of 25 cm must in any given case be left free between the individual inlaid floor laminae in order to be able to tolerate a discharge delay of 0.25 seconds without blocking effects.

SUMMARY

Proceeding from this state of the art, underlying the invention is the object of improving a sorting device of the type mentioned at the beginning so that higher operating speeds and a higher through-put of laminae are attainable.

This objective is accomplished by a device with the features of appended patent claim 1.

Advantageous configurations and refinements of the invention are apparent on the basis of patent claims 2 to 11.

The solution of the invention thus deviates from the previously known way of standing transport of the laminae and makes use of the advantages of transportation lying down. The disadvantages of lying down transport are avoided by a new delivery principle: The deflection apparatus transmits an upwardly directed impulse to the laminae as needed so that the laminae are lifted upwardly from the transport track. As it immediately becomes apparent, at the moment of deflection of a lamina, its adhesive friction is reduced to zero so that the delivery process can take place completely without delay. Since the laminae are not thrown out crosswise in relation to the direction of transport, but rather only receive an additional upward impulse, their kinetic energy on the basis of the transport process is used for the discharge process. In this way, higher transport speeds are realizable without negative effects upon the discharge process. Through the principle of power thrust or impulse transmission, even uneven inlaid floor laminae can be discharged trouble-free in a defined manner without delay.

The deflection apparatus for transmitting an upwardly directed impulse to the laminae can be a device for generating an air thrust, for example a controllable jet connected with a compressed air system which acts upon the laminae through a gap or an aperture in the transport track. The deflection apparatus can also be a simple actuator or a tilting panel functioning as a switch arranged in the transport track.

Particular advantages arise through an additional guide element which is arranged above the delivery point and which serves for passing laminae diverted upwardly by the deflecting apparatus to the delivery point. An air thrust used, for example, to deflect must then not transmit an exactly calculated, defined impulse. Rather it suffices for the impulse transmitted to exceed a minimum value so that the corresponding lamina also reaches the delivery track. An excessively high impulse is then intercepted by the guide element, and a defined transfer of the laminae to the delivery track takes place in any case. The guide element can be dimensioned such that laminae of the most varied length can be reliably discharged. It then suffices for the front end of the laminae to be acted upon by a sufficiently strong impulse to conduct the discharge process.

Further particular advantages become apparent when the guide element just mentioned is constructed such that the motion of the diverted laminae is accelerated in the direction of the delivery track. This brings about an active upward withdrawing of the laminae to be discharged which prevents any disadvantageous delay in the discharge process. The acceleration can, for example, be realized by constructing the guide element as a driven conveyor against which the laminae to be discharged are pressed by the upwardly directed impulse of the deflection apparatus. In order to increase the friction between the laminae to be discharged and the guide element constructed as a conveyor band, the latter can be provided with a vacuum apparatus to suck up the diverted laminae, on the basis of which a suction conveyor band for hanging transport results.

The delivery track is appropriately constructed as an ascending conveyor band so that the direction of motion of the laminae, except during deflection at the delivery point, no longer needs to be altered. Thus very high conveyance speeds are also manageable with correspondingly high kinetic energies.

In this manner, further advantages emerge if a basically horizontally arranged deceleration band running crosswise to the delivery track is connected to the delivery track such that the delivery track throws the laminae from the ascending inclination onto the deceleration band. In this way, the individual laminae fall flat on the deceleration band and do not strike perhaps first with their front end on this. The increased adhesion friction due to plane-parallel contact of the laminae on the deceleration band, which serves to brake the transport motion, further contributes to making higher transport speeds, and therewith higher through-puts through the sorting device, manageable.

Finally, even the transport track can be provided with a conveyor band and an associated vacuum apparatus. In this way, the friction between the laminae to be sorted and the transport track is increased once again which also makes possible very high transport speeds with correspondingly high laminae through-put.

BRIEF DESCRIPTION OF THE DRAWINGS

Three embodiments of the invention are described and explained in greater detail below on the hand of the appended drawings, wherein.

DETAILED DESCRIPTION OF THE PREFERRED EMBODIMENTS

Figure 1:
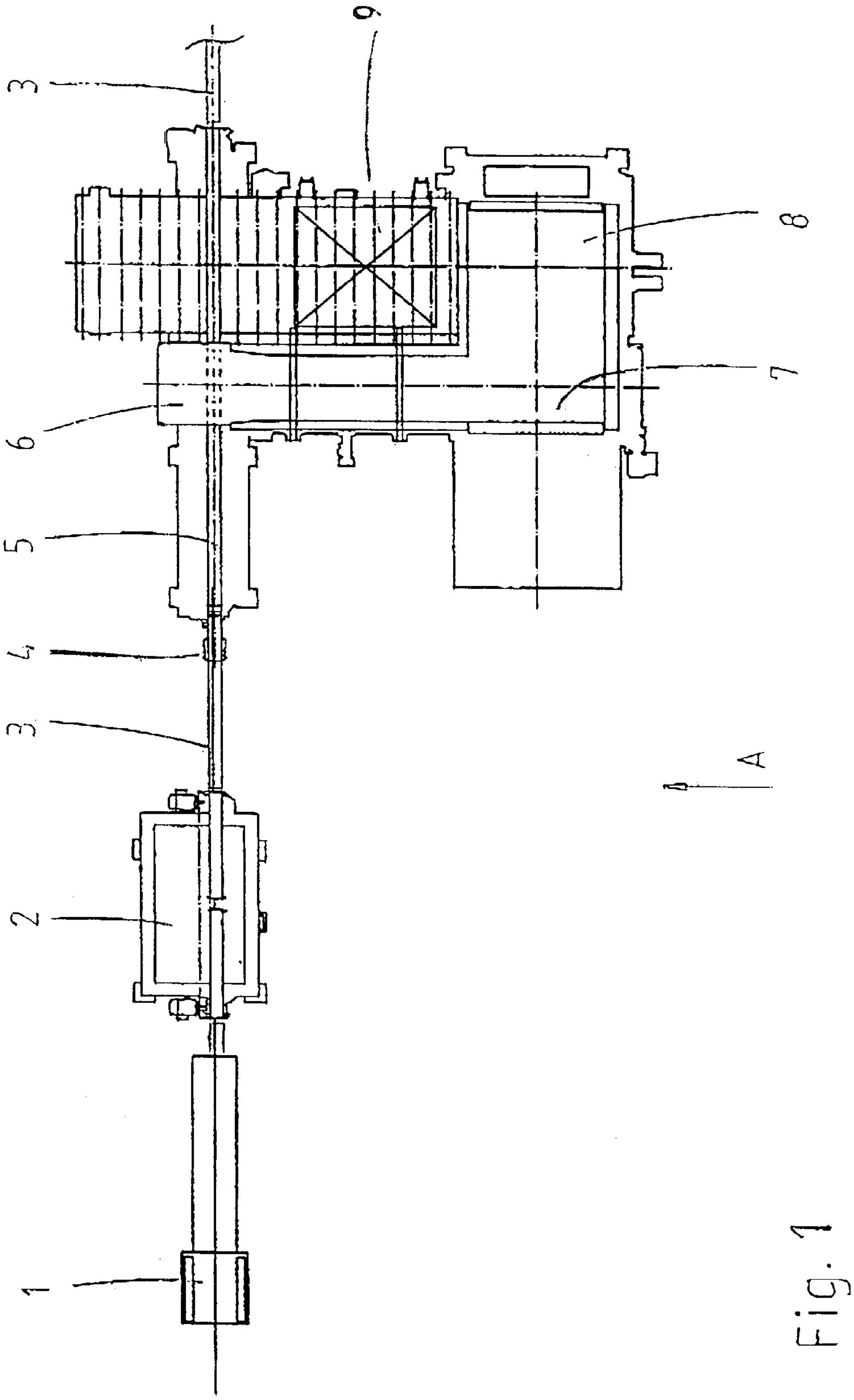
FIG. 1 shows a schematic plan view on a sorting device of the invention.

The plan view shown in FIG. 1 provides a general overview of the entire facility with a sorting device for inlaid floor laminae: Inlaid floor laminae are separated from a magazine 1 and moved lying flat through a camera station 2, where they are optically scanned and classified into various quality gradations. Afterward they pass through a transport track 3 with a delivery point 4. Inlaid floor laminae with a certain quality class are delivered at the delivery point 4 to a delivery track 5, where they reach a deceleration band 6 transporting crosswise toward the delivery track 5. From there they are pushed by means of a transfer conveyor 7 to a collecting band 8 in groups which cover a palette surface, and from there finally reach a palette conveyor 9. Those laminae which do not belong to this special quality class are not sorted out at the delivery point 4 and run further on the transport track 3 and indeed, according to the number of quality classes, if need be over further correspondingly constructed delivery points (not represented).

Figure 2:
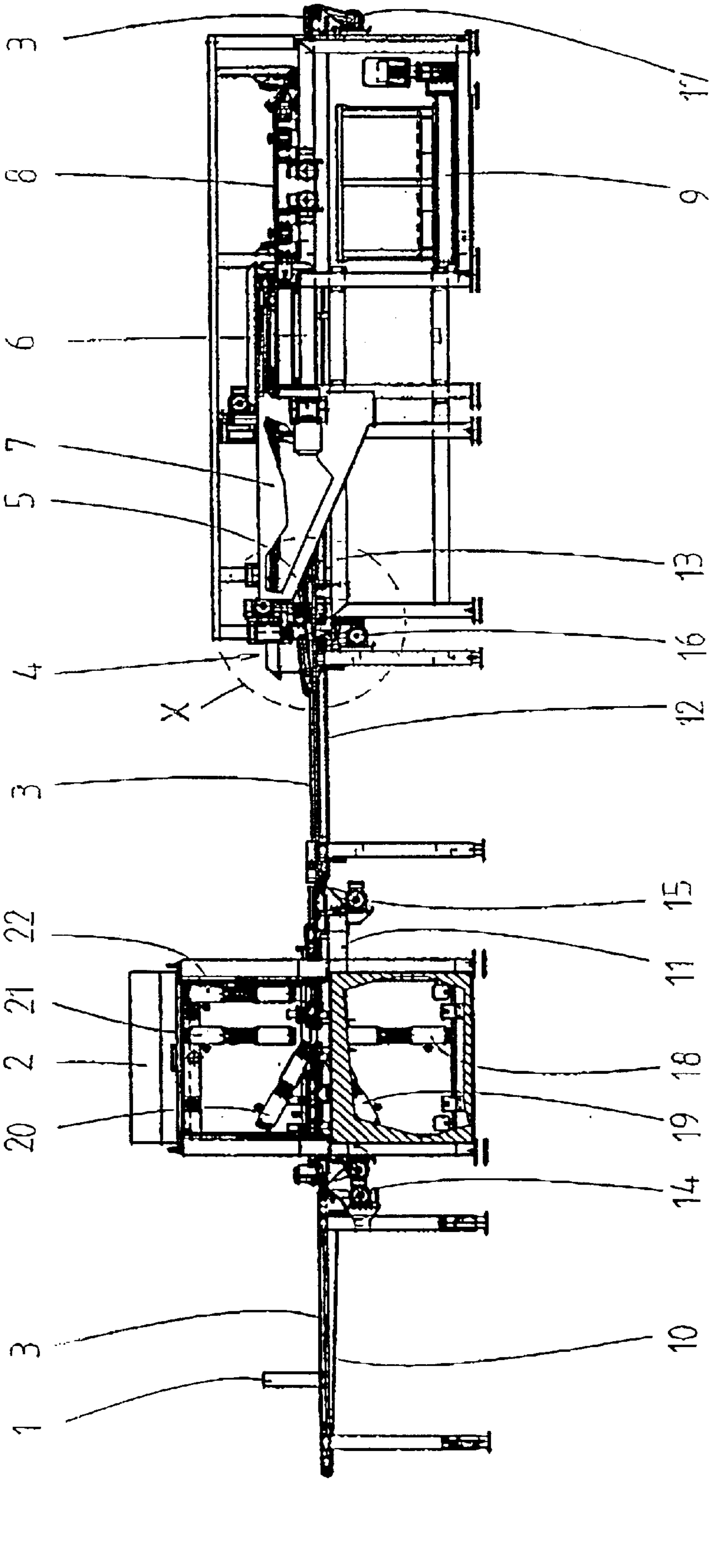
FIG. 2 depicts a view from direction A in accordance with FIG. 1.

FIG. 2, which is an elevation from direction A in accordance with FIG. 1, shows that the discharge of the inlaid floor laminae at delivery point 4 is undertaken running upwardly: The inlaid floor laminae to be sorted out of the transport track at delivery point 4 are diverted by a deflection process described in greater detail on the basis of FIG. 3 to the delivery track 5 which ascends upwardly over transport track 3 from left to right. The delivery track 5 runs from the delivery point 4 to the deceleration band 6 ascending linearly so that the discharged inlaid floor laminae are delivered out with this inclination to the deceleration band 6 and, as a consequence of this, land plane-parallel upon the deceleration band 6. It is recognizable in this view that the deceleration band 6, the transfer conveyor 7 and the collecting band 8 are located in a plane above the transport track 3, while the palette conveyor 9 with the sorted inlaid floor laminae present undertakes are lowered to floor level.

As is clear on the basis of FIG. 2, the transport track 3 is composed of a number of conveyor bands 10, 11, 12, 13 with allocated drive units 14, 15, 16, 17 in any given case. The camera station 2 is outfitted with a total of five CCD cameras 18, 19, 20, 21, 22 in order to be able to guarantee a reliable grouping of the inlaid floor laminae passing through according to various criteria even with very high through-puts and corresponding conveyance speeds.

Figure 3:
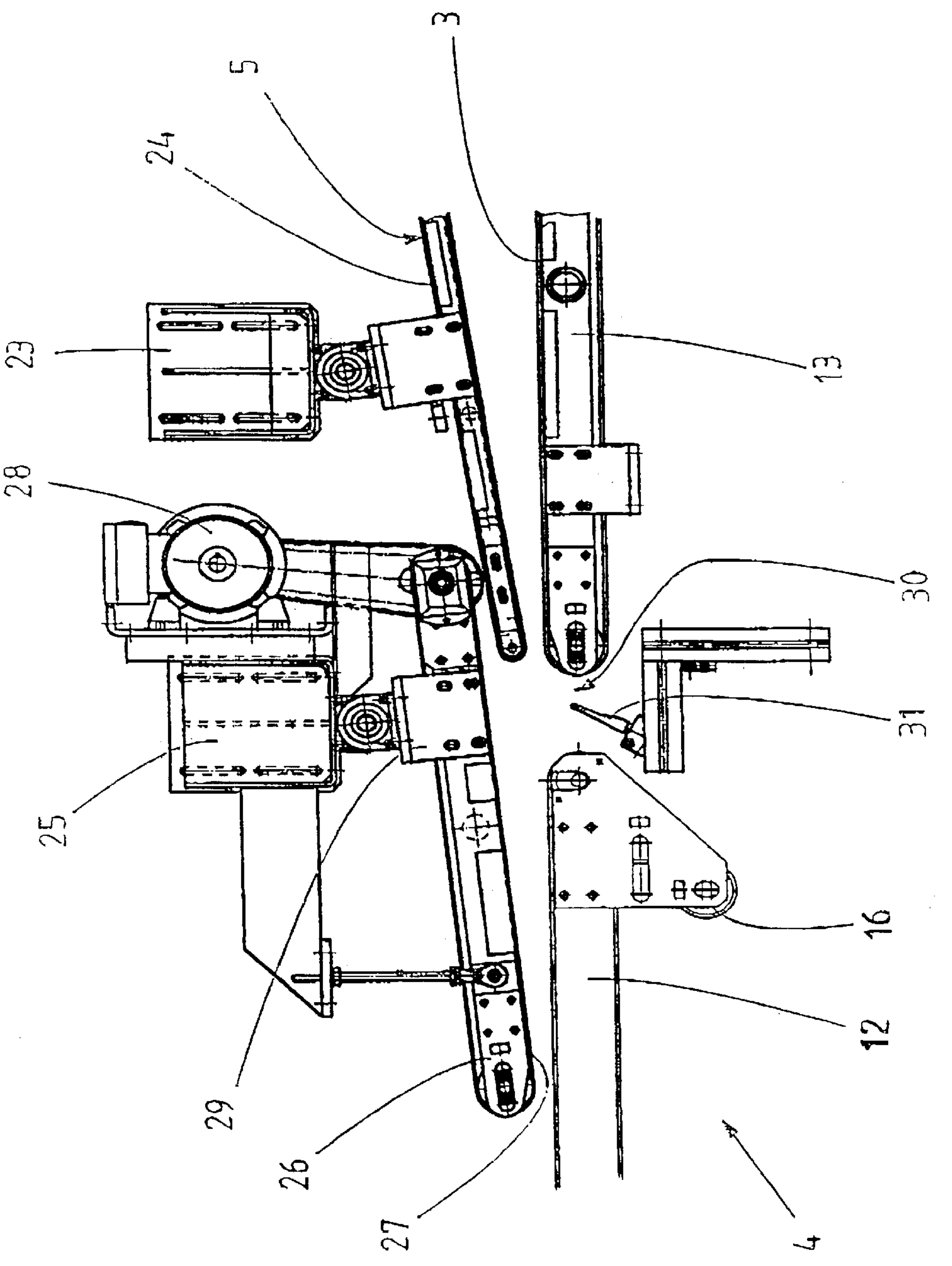
FIG. 3 illustrates detail X from FIG. 2.

The core element of this facility according to the invention is the sorting arrangement at delivery point 4, which is represented in FIG. 3, which shows a detail enlargement of detail X from FIG. 2. The delivery track 5 which is constructed as a normal conveyor band 24 arranged ascending over the transport track 3 is fastened at a first suspension 23. Above the transport track 3 and the delivery track 5, a guide element 26 is fastened at delivery point 4 on a second suspension 25 and is likewise constructed as conveyor band 27 with associated drive unit 28. This conveyor band 27 is nonetheless intended for "hanging" transport, and for this purpose is provided with a vacuum unit 29 which makes it into a vacuum band conveyor. Between conveyor bands 12 and 13, which together form a part of the transport track 3, there is situated at delivery point 4 a gap 30 in which a flat nozzle 31 is located for applying an air thrust to the inlaid floor laminae to be sorted out on the delivery point 4.

The functioning at the delivery point 4 of this embodiment is recognizable on the basis of FIG. 3: An inlaid floor lamina conveyed lying lengthwise on conveyor band 12, the length of which exceeds the width of gap 30, is normally passed along the transport track 3 to conveyor band 13. Only when the central control unit of the facility has calculated on the basis of data reported by the camera station 2 and on the basis of the transport speed of the transport track 3 that a lamina with the quality gradation to be sorted out at this delivery point 4 is reaching gap 30 is the flat nozzle 31 actuated so that it generates an air thrust which lifts the front end of the inlaid floor laminae upwardly and presses it against guide element 26. Guide element 26 ensures that the inlaid floor lamina is then passed over in an orderly manner to the delivery track 5. The vacuum facility 29 supports this process since it holds on to the inlaid floor lamina as soon as it is pushed upwardly by the flat nozzle 31 against guide element 26, resulting in the upward removal of the lamina from the transport track 3. Since the guide element 26 is moreover constructed as a driven conveyor band 27 and this conveyor band preferably runs faster than conveyor band 12, there results when lifting the inlaid floor laminae to be sorted out from transport track 3 an acceleration effect which reliably prevents any disadvantageous delay in discharging. It is obvious that the guide element 26 need neither be constructed as a conveyor band 27 nor have a vacuum apparatus 29 in order to guarantee a defined transfer to the delivery track 5. Of course, constructing the guide element 26 as a suction band conveyor makes possible especially high run through speeds for inlaid floor laminae which, for example, can be supported by constructing conveyor bands 12 and 13 of the transport track 3 as suction band conveyors with corresponding vacuum apparatuses 33.

Figure 4:
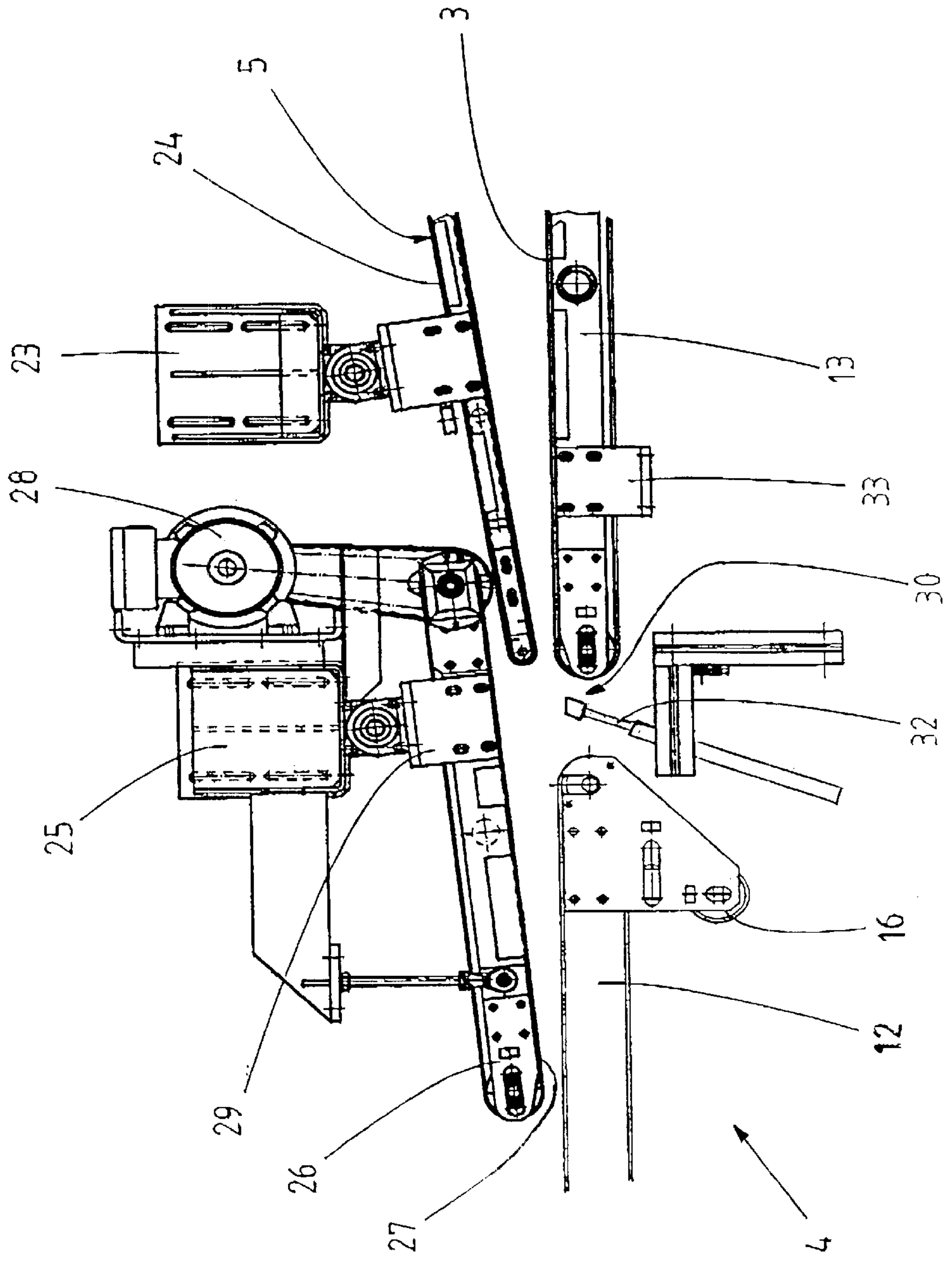
FIG. 4 provides a view corresponding to FIG. 3, but with another embodiment of the invention.

FIG. 4 is similar to FIG. 3 and shows the core of the facility, the sorting arrangement at the delivery point 4, whereby here an embodiment is depicted which transmits the upwardly directed impulse of the invention through an actuator 32 which here is formed from a piston-cylinder unit to be activated pneumatically. The remaining elements of the delivery point 4 illustrated in FIG. 4 are identical with those elements shown in FIG. 3 and are in each case provided with the same reference number so that for the rest, reference may be made to the description above.

Figure 5:
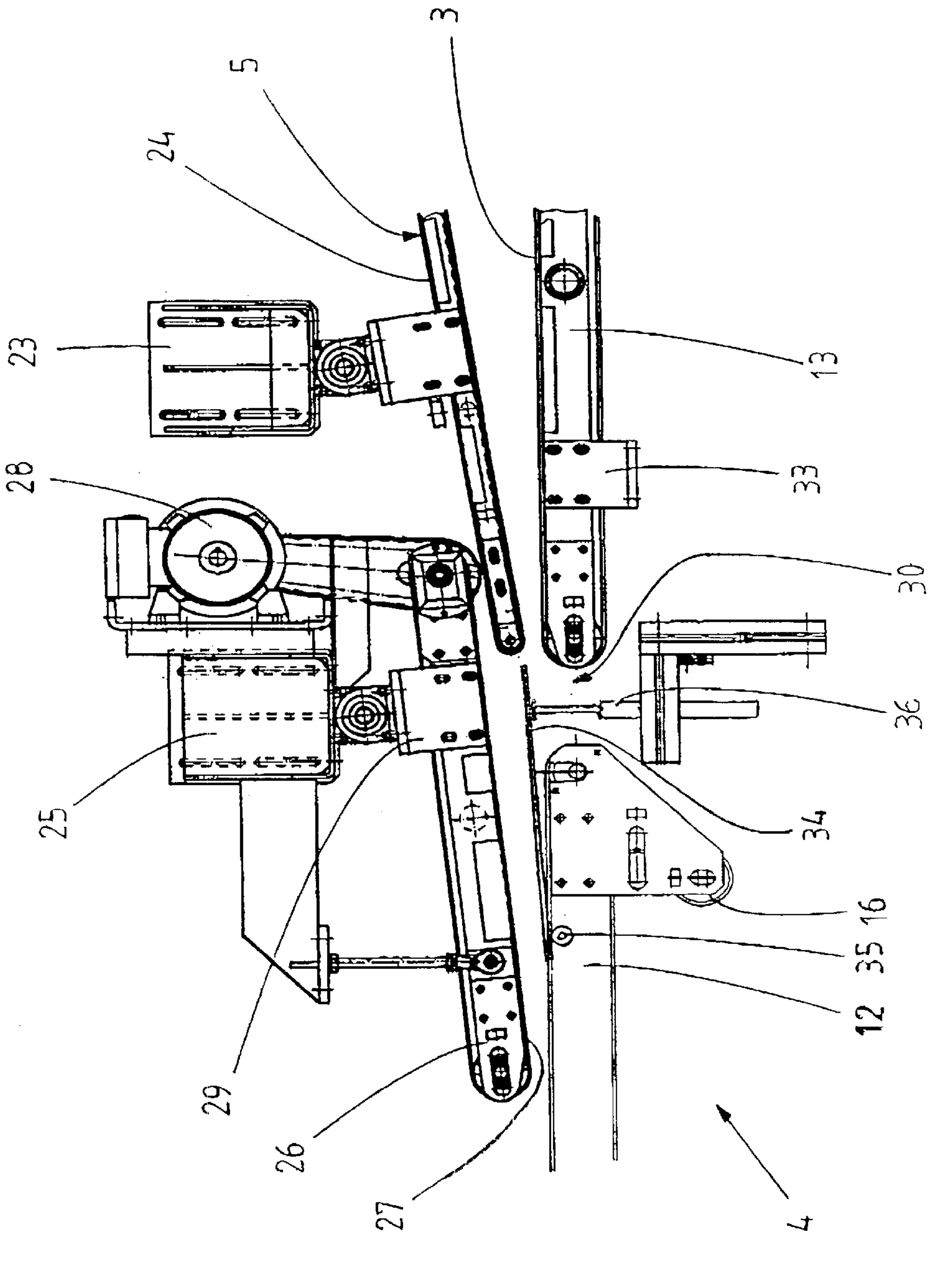
FIG. 5 is a view corresponding to FIG. 3, but with a further embodiment of the invention.

This also holds for FIG. 5, which shows a third principle for transmitting the upwardly directed impulse of the invention to the inlaid floor laminae to be discharged: Gap 30 is bridged between conveyor bands 12 and 13 with a tilting panel 34 which is pivoted on an axis 35 and can divert the inlaid floor laminae to be sorted out upwardly in the manner of a switch. FIG. 5 depicts the tilting panel 34 in half inclined position, thus exactly between the two possible end positions for conveying or discharging the inlaid floor laminae. The tilting panel 34 is actuated by a pneumatically activated piston-cylinder unit 36 arranged in gap 30. As is immediately clear, the embodiment with tilting panel 34 has the advantage that even relatively short inlaid floor laminae which can not so easily span the gap 30 can be upwardly discharged without difficulties.

Reference Number List

| | |
|---|---|
| 1 | Magazine |
| 2 | Camera station |
| 3 | Transport track |
| 4 | Delivery point |
| 5 | Delivery track |
| 6 | Deceleration band |
| 7 | Transfer conveyor |
| 8 | Collecting band |
| 9 | Palette conveyor |
| 10 | Conveyor band |
| 11 | Conveyor band |
| 12 | Conveyor band |
| 13 | Conveyor band |
| 14 | Drive unit |
| 15 | Drive unit |
| 16 | Drive unit |
| 17 | Drive unit |
| 18 | CCD camera |
| 19 | CCD camera |
| 20 | CCD camera |
| 21 | CCD camera |
| 22 | CCD camera |
| 23 | Suspension (first) |
| 24 | Conveyor band |
| 25 | Suspension (second) |

-continued

| | |
|---|---|
| 26 | Guide element |
| 27 | Conveyor band |
| 28 | Drive unit |
| 29 | Vacuum apparatus |
| 30 | Gap |
| 31 | Flat nozzle |
| 32 | Actuator |
| 33 | Vacuum apparatus |
| 34 | Tilting panel |
| 35 | Axis |
| 36 | Piston-cylinder unit |

What is claimed is:

1. Sorting device for laminae, comprising a generally horizontally extending transport track (3) for the laminae with at least one delivery point (4) for discharging the laminae to be sorted from the transport track (3) and with a delivery track (5) proceeding from the delivery point (4), whereby the delivery point (4) is provided with a deflection apparatus that is selectively actuatable for diverting the laminae to be sorted to the delivery track (5), the deflection apparatus including a device for transmitting an upwardly directed impulse only on a front section of the laminae to be diverted, and at least a starting portion of the delivery track (5) is arranged above the transport track (3).

2. Sorting device according to claim 1, wherein the deflection device comprises a device (31) for generating an air thrust acting on the laminae.

3. Sorting device according to claim 1, wherein the deflection device comprises an actuator (32) that acts on the laminae.

4. Sorting device according to claim 1, wherein the deflection device comprises a tilting panel (34) arranged in the transport track (3).

5. Sorting device according to claim 1, wherein above the delivery point (4), a guide element (26) is arranged for guiding the laminae diverted upwardly by the deflection apparatus (31) from the delivery track (5).

6. Sorting device according to claim 5, wherein the guide element (26) is constructed such that it accelerates the motion of the diverted laminae in a direction of the delivery track (5).

7. Sorting device according to claim 5, wherein the guide element (26) is a conveyor band (27).

8. Sorting device according to claim 7, wherein the conveyor band (27) is provided with a vacuum apparatus (29) for suction upon the diverted laminae.

9. Sorting device according to claim 1, wherein the delivery track (5) is constructed as an ascending conveyor band (24).

10. Sorting device according to claim 9, wherein a generally horizontally arranged deceleration band (6) extending crosswise in relation to the delivery track (5) is connected to the delivery track (5) such that the delivery track (5) delivers out the laminae from the ascending inclination onto the deceleration band (6).

11. Sorting device according to claim 1, wherein the transport track (3) includes a conveyor band (10, 11, 12, 13) and a vacuum apparatus (33).

* * * * *